April 21, 1931.  H. G. MUELLER  1,801,752
LOCOMOTIVE VALVE GEAR
Filed Dec. 12, 1928  2 Sheets-Sheet 2
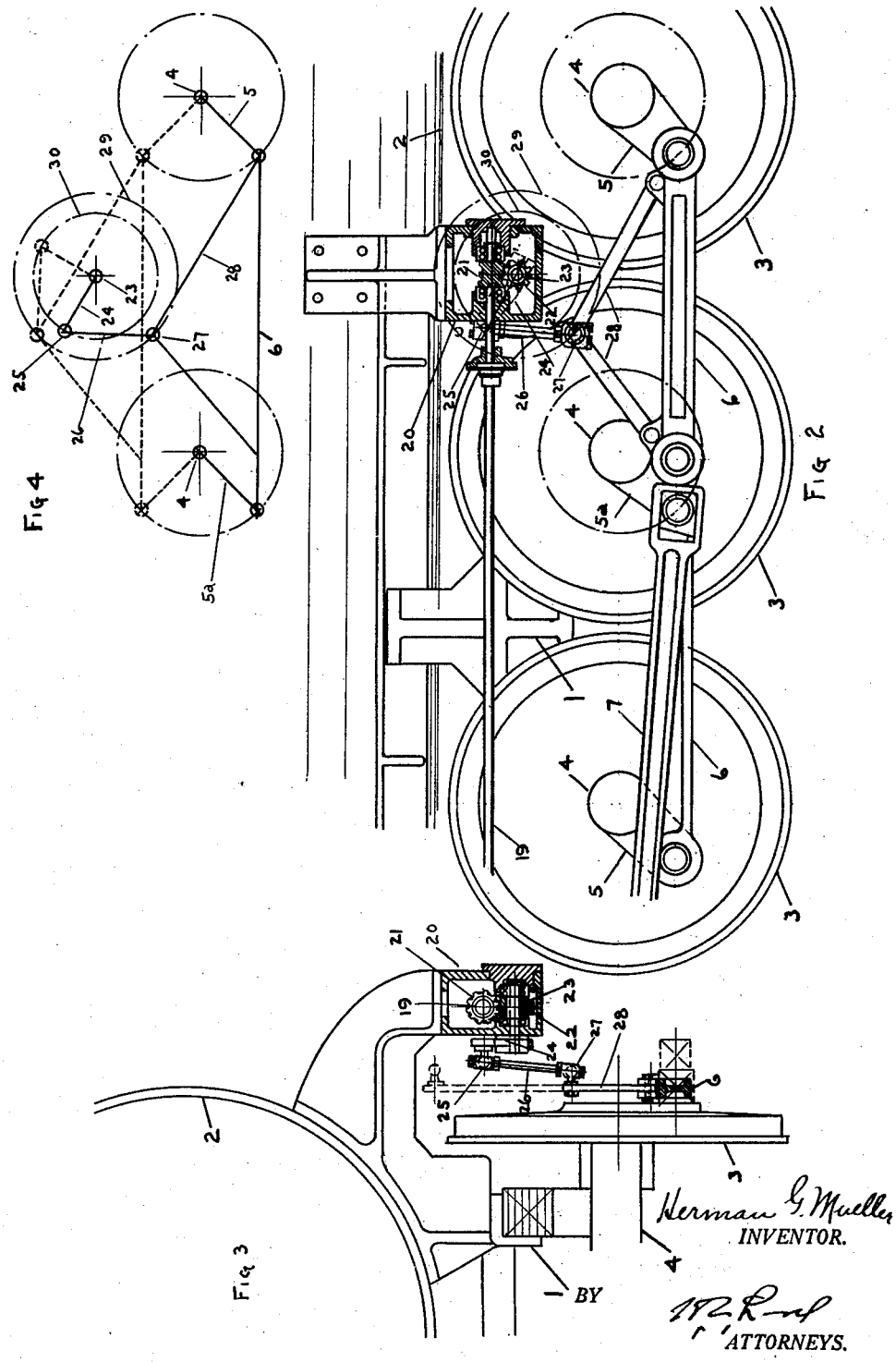

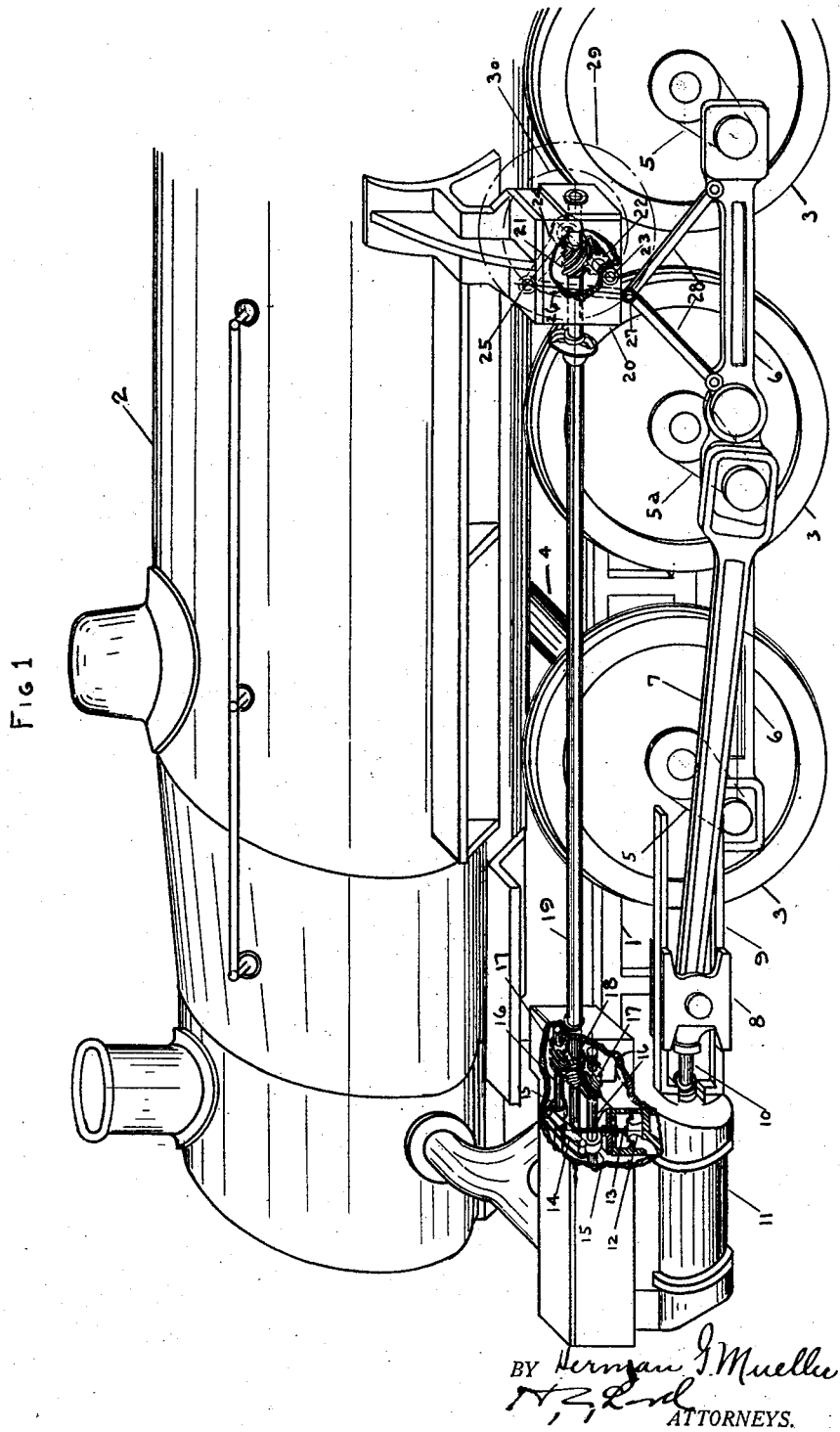

Patented Apr. 21, 1931

1,801,752

UNITED STATES PATENT OFFICE

HERMAN GUNDERT MUELLER, OF ERIE, PENNSYLVANIA, ASSIGNOR TO SKINNER ENGINE COMPANY, OF ERIE, PENNSYLVANIA, A CORPORATION OF PENNSYLVANIA

LOCOMOTIVE VALVE GEAR

Application filed December 12, 1928. Serial No. 325,430.

This valve gear is designed to actuate a valve involving a rotating driving means, particularly valves of the poppet type which are actuated by cams. The present invention provides a simple means for actuating such valve mechanism from the crank of the locomotive and in position to be readily accessible for servicing. The axles of locomotives are usually yieldingly mounted in the frame and the valve gear usually mounted on the frame. The relative movement between the axles and the frame must be taken care of in the connection between the driving axls of the locomotive and the valve gear. The present mechanism accomplishes this purpose in a simple manner and provides for a direct orbital driving scheme complete in itself at each side of the locomotive so that disturbances at one side of the locomotive in axle position are not communicated to the opposite side of the loccomotive. Features and details of the invention will appear from the specification and claims.

A preferred embodiment of the invention is illustrated in the accompanying drawings as follows:—

Fig. 1 shows a perspective view of a portion of a locomotive, partly in section, showing the valve gear in place.

Fig. 2 a side elevation of a part of a locomotive showing the valve gear driving connections.

Fig. 3 an end view of the locomotive, partly in section, to better show construction.

Fig. 4 a diagrammatical view showing the relation of the driving elements.

1 marks the locomotive frame, 2 the boiler, 3 the drive wheels, 4 the axles, 5 and 5a the cranks mounted on the axles, 6 the connecting rod connecting the cranks, 7 the pitman extending from the crank 5a to the cross head 8, 9 cross head guides which are supported from the frame, and 10 a piston rod connected with the piston (not shown) in the cylinder 11. A controlling valve 12 is shown. This is provided with a valve stem 13. The valve stem is secured to a rider 14 which operates on cams 15. The cams are carried by shafts 16. Gears 17 are fixed on the shafts 16 and mesh with a gear 18. The gear 18 is driven from a valve actuating rod 19 which extends into a gear box 20. It will readily be seen that if the cams 15 are rotated through the action of the shafts 18 and rod 19 that the rider 14 will respond to the combined movements of the cams and this movement will be communicated to the valve actuating the valve to control the steam passing to the cylinder. This particular valve mechanism is not the subject of this application but illustrates a valve mechanism which is dirven from a rotating shaft.

A gear 21 is fixed on the shaft 19 and meshes with a gear 22 arranged on a cross shaft 23. The cross shaft is journaled in the gear box and extends through the walls of the gear box. A crank 24 is arranged on the inner end of the shaft. This crank has a crank pin 25. A link 26 is connected with the crank pin with a ball joint and is connected with a similar joint with a pin 27. The pin 27 is arranged on a post 28 extending upwardly from the connecting rod. Preferably this post is formed by a bar forming with the connecting rod a triangle with the pin 27 at the apex.

The orbit of the pin 27 is indicated by the dash line 29 and the orbit of the pin 25 is illustrated by the dash line 30. It will be seen that the pin 25 has an orbit about the axis of the cross shaft and, therefore, it is positively driven throughout the orbit and, therefore, the crank 24 is directly driven throughout the orbit through the connecting link 26 from the pin 27, in other words, there can be no dead center and the driving mechanism is, therefore, complete at one side of the locomotive. Further this connecting link provides a means which permits of relative movement between the axles of the locomotive and the axis of the cross shaft, in other words, takes up the necessary movement of the axle relatively to the frame. The mechanism forms a rugged connection, one of simplicity and one which is readily accessible at the side of the locomotive.

What I claim as new is:—

1. In a locomotive valve gear, the combination of an axle; an axle crank on the axle; a rod given an orbital movement by the crank; a cross shaft; an engine valve; a driving connection between the engine valve and cross shaft; a shaft crank on the cross shaft; a link bearing on the rod having an orbit around the axis of the cross shaft; and a link connection connecting the bearing and the shaft crank.

2. In a locomotive valve gear, the combination of an axle; an axle crank on the axle; a rod given an orbital movement by the crank; a cross shaft; a shaft crank on the cross shaft; a link bearing on the rod having an orbit around the axis of the cross shaft; a link connection connecting the bearing and the shaft crank; a gear box in which the cross shaft is journaled; a gear on the cross shaft; a valve actuating shaft at an angle to the cross shaft; and a gear on the valve actuating shaft meshing with the gear on the cross shaft.

3. In a locomotive valve gear, the combination of an axle; an axle crank on the axle; a rod given an orbital movement by the crank; a cross shaft; a shaft crank on the cross shaft; a link bearing on the rod having an orbit around the axis of the cross shaft; a link connection connecting the bearing and the shaft crank; a gear box in which the cross shaft is journaled; a gear on the cross shaft; a valve actuating shaft at an angle to the cross shaft; a gear on the valve actuating shaft meshing with the gear on the cross shaft; a locomotive frame; and a bracket supported from the frame and supporting the gear box.

4. In a locomotive valve gear, the combination of axles; axle cranks on the axles; a connecting rod between the cranks, said rods having an orbital movement; a cross shaft; an engine valve; a driving connection between the engine valve and cross shaft; a shaft crank on the cross shaft; a link bearing on the connecting rod having an orbit around the axis of the shaft; and a link connection between the bearing and the shaft crank.

5. In a locomotive valve gear, the combination of axles; axle cranks on the axles; a connecting rod between the cranks, said rods having an orbital movement; a cross shaft; an engine valve; a driving connection between the engine valve and cross shaft; a shaft crank on the cross shaft; a post on the connecting rod formed of a bar forming with the connecting rod a triangle; a link bearing at the apex of the triangle having an orbit around the axis of the cross shaft; and a link connecting the bearing and the cross shaft crank.

In testimony whereof I have hereunto set my hand.

HERMAN GUNDERT MUELLER.